US007184935B1

(12) United States Patent
Cohen et al.

(10) Patent No.: US 7,184,935 B1
(45) Date of Patent: Feb. 27, 2007

(54) DETERMINING AND ANNOTATING A SIGNATURE OF A COMPUTER RESOURCE

(75) Inventors: Ira Cohen, Sunnyvale, CA (US); Moises Goldszmidt, Moss Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/149,566

(22) Filed: Jun. 10, 2005

(51) Int. Cl.
*G06F 3/01* (2006.01)
(52) U.S. Cl. .................. 702/186; 702/179; 702/182; 702/189
(58) Field of Classification Search ............ 702/179, 702/182, 183, 186, 189, 194; 707/100; 709/200; 713/151, 201
See application file for complete search history.

(56) References Cited

U.S. PATENT DOCUMENTS

| 6,842,906 B1 * | 1/2005 | Bowman-Amuah ......... 719/330 |
| 2005/0015624 A1 * | 1/2005 | Ginter et al. ............... 713/201 |

OTHER PUBLICATIONS

Aquilera, M.K. et al., "Performance Debugging for Distributed Systems of Black Boxes", SOSP'03, ACM, Oct. 2003.
Barham, P. et al., "Using Magpie for Request Extraction and Workload Modelling", Microsoft Research, Cambridge, UK, downloaded Jun. 10, 2005.
Bodik, P. et al., "Combining Visualization and Statistical Analysis to Improve Operator Confidence and Efficiency for Failure Detection and Localization", downloaded Jun. 10, 2005.
Candea, G. et al., "Microreboot-A Technique for Cheap Recovery", Proc. of the 6th Symposium on Operating Systems Design and Implementation, Dec. 2004.
Chen, M.Y. et al., "Pinpoint: Problem Determination in Large, Dynamic Internet Services", downloaded Jun. 10, 2005.
Cohen, I. et al., "Correlating Instrumentation Data to System States: A Building Block for Automated Diagnosis and Control", downloaded Jun. 10, 2005.
Denehy T. E. et al., "Bridging the Information Gap in Storage Protocal Stacks", downloaded Jun. 10, 2005.
Jacobs, D., "Distributed Computing with BEA Weblogic Server", Proceedings of the 2003 CIDR Conference, 2003.
Kephart, J.O. et al., "Automatic Extraction of Computer Virus Signatures", Proceed. of the 4th Virus Bulletin International Conf., England, 1994, p. 178-184.

(Continued)

*Primary Examiner*—Marc S. Hoff
*Assistant Examiner*—Felix Suarez
(74) *Attorney, Agent, or Firm*—Richard P. Lange

(57) ABSTRACT

Metrics for a computer resource are collected. A signature representing a state of the computer resource from the metrics are determined by determining raw values for each of the metrics and generating a vector from at least some of the raw values for the metrics, where generating the vector further comprises generating models for possible system states of the computer resource, determining a model that closely matches a state of the computer resource, determining key metrics for the model, and determining a vector of values from the key metrics. An annotation that describes the state of the computer resource is received and associated with the signature. The signature and the associated annotation are stored such that they are searchable.

24 Claims, 4 Drawing Sheets

OTHER PUBLICATIONS

Kiciman, E. et al., "Detecting Application-Level Failures in Component-Based Internet Services", downloaded Jun. 10, 2005.

Mosberger, D. et al., "HTTPERF-A Tool for Measuring Web Server Performance", HP Research Labs, downloaded Jun. 10, 2005.

Oppenheimer, D. et al, "Why do Internet Services Fail, and What Can Be Done About It?", 4th Usenix Symposium on Internet Technologies and Systems, 2003.

Pai, V.S. et al., "IO-Lite: A Unified I/O Buffering and Caching System", ACM Transactions on Computer Systems, Feb. 2000, vol. 18, No. 1, pp. 37-66.

Welsh, M. et al., "SEDA: An Architecture for Well-Conditioned, Scalabe Internet Services", 18th Symposium on Operating Principles, Oct. 2001.

Zhang, S. et al., "Ensembles of Models for Automated Diagnosis of System Performance Problems", HP Labs, HPL-2005-3, Internal Accession Data Only Jan. 6, 2005.

"Systems Management: Application Response Measurement (ARM) API", The Open Group, UK, Jul. 1998.

http://www.smarts.com, System Management Arts (SMARTS) Inc., downloaded Jun. 10, 2005.

* cited by examiner

DETERMINING AND ANNOTATING A SIGNATURE OF A COMPUTER RESOURCE

BACKGROUND

Computer systems in use today may be very complex and are typically monitored using a large number of measurable metrics. If a computer system is not functioning as expected, an administrator may be called in to diagnose and solve the problem. A variety of problems can be solved by simple techniques, such as rebooting, but many cannot. Understanding and documenting the likely causes of such problems is difficult, because they often emerge from the behavior of a collection of many metrics, such as CPU load, disk I/O rates, etc. Therefore, simple "rules of thumb" focusing on a single metric are usually misleading. Today there is no systematic way to leverage past diagnostic efforts when a problem arises, even though such efforts may be lucrative for maintaining a computer system.

SUMMARY

According to an embodiment, metrics for a computer resource are collected. A signature representing a state of the computer resource is determined from the metrics. An annotation associated with the state of the computer resource is received.

BRIEF DESCRIPTION OF THE DRAWINGS

Embodiments of the invention are illustrated by way of example and without limitation in the accompanying figures in which like numeral references refer to like elements, and wherein.

DETAILED DESCRIPTION

Figure 1:
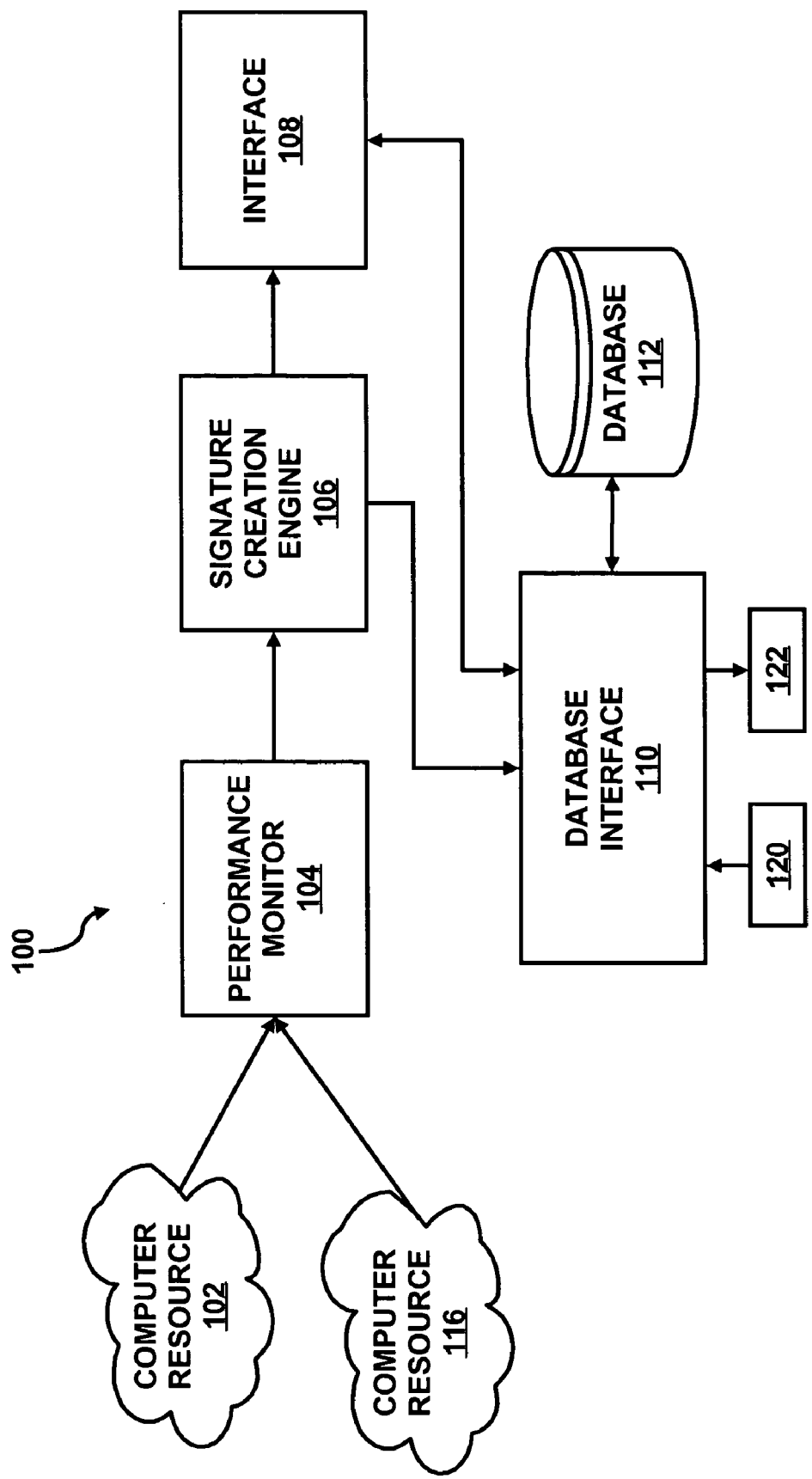
FIG. 1 shows a block diagram of a system for creating a signature database in accordance with an embodiment of the invention.

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

According to an embodiment, a system collects metrics of a computer resource. A computer resource is any resource within a computing environment. A computer resource may include hardware, such as one or more hardware components. Examples of hardware components include processors, volatile and non-volatile memory, and hard disks. A computer resource may include software components, such as one or more of applications, databases, operating systems, and networking software. A computer resource may include a combination of hardware and software components. A computer resource may include a computer system or a group of computer systems, such as a server, a server group, or a router. The metrics are any measurable features of the computer resource. For instance, server response time or pages served per time period are examples of metrics. Other examples include CPU utilization, memory utilization, disk utilization and bandwidth. These features, for example, are related to the measured performance of the computer resource.

The system collects metrics of the computer resource and converts the metrics into a signature representing a state of the computer resource. A signature is a representation of a state of the computer resource. The signature is annotated with information describing the state of the computer resource, referred to as the annotation. The information may be associated with a problem of the computer resource. A problem may include a performance problem, a fault of the computer resource or a failure of the computer resource and the signature is identified when the computer resource is having the problem. The annotation may include one or more of a description of the problem, a diagnosis of the problem and a solution to the problem. Signatures and annotations may be determined for a computer resource even when the computer resource does not have a problem and may be used for capacity planning and describing normalcy states of the computer resource, such as when the computer resource is operating within predetermined parameters. One or more of the predetermined parameters, for example, are determined from service level objectives (SLOs) or service level agreements (SLAs). For example, the annotation may describe a state where the computer resource is load-balanced. SLOs are parameters that should be met by a service, which may include one or more applications. For example, the parameters may include service metrics that are measured and compared to the parameters specified in the SLOs. An example of an SLO is average response time of requests to a service being less than 5 seconds. The response time is measured and compared to the 5-second threshold to determine whether there is a violation. SLOs may be specified in SLAs.

Signatures may be periodically determined, such as for each time interval when metrics are collected. According to an embodiment, the signatures and corresponding annotations are stored in a database such that the signatures and corresponding annotations are searchable. A user may use the database to search for signatures. In one example, a user may search for signatures to diagnose and fix problems associated with another computer resource. This may be accomplished by collecting metrics of the computer resource with the problem and converting the metrics into a signature. This signature, referred to as the search signature, is used to search the database to identify a signature which is closely matches the search signature. The user may then retrieve the annotation associated with the known signature to possibly determine a diagnosis and solution to the problem. This method significantly reduces the time and effort usually needed to diagnosis computer related problems. This is especially true in large complex computer systems where the number of metrics to consider may be very large.

With reference first to FIG. 1, there is shown a block diagram of a system 100 for creating a signature database, according to an embodiment. The system 100 includes a computer resource 102, a performance monitor 104, a signature creation engine 106, an interface 108, a database interface 110, and a database 112.

In one example, the performance monitor 104 measures metrics associated with the computer resource 102. The metrics may be measured over time periods. For instance, the performance monitor 104 may measure a group of metrics over 5 minute intervals. This time period is adjustable depending on the nature and use of the computer resource 102. For instance, if the computer resource 102 is used in a less predictable interactive environment, such as a web server responding to customer requests, a small measurement interval may be chosen to meaningful measure data spikes throughout the day. On the other hand, if the computer resource 102 is used in a controlled and more predictable environment, such as computer resource running a batch job, a longer measurement interval may be chosen to reduce the amount of measurements required by the performance monitor 104. In one example, measurements for a metric taken during a measurement interval may be averaged and used as the value for the metric for that time interval.

The metrics collected by the performance monitor 104 are sent to the signature creation engine 106. The signature creation engine 106 uses the metrics to generate signatures. A signature is a representation of a state of a computer resource.

In one embodiment, the signature creation engine 106 uses raw values for each metric to create signatures. Raw values are the measurements for each metric or values determined from the measurements of each metric. For example, a measured CPU utilization for a time interval is 80%, which is a measurement of a metric. In another example, the raw value is a mean of a plurality of measurements. A signature may be provided for each time interval. For example, the signature may be represented as $S_T=[M_1, M_2, M_3, \ldots M_n]$ where $M_1 \ldots M_n$ are raw values of the measured metrics and $S_T$ is a signature for the time interval T.

In another embodiment, the signature creation engine 106 creates signatures using metric attribution to generate an attribute vector. An example of determining an attribute vector using metric attribution is described in U.S. patent application Ser. No. 10/987,611, entitled "Automated Diagnosis and Forecasting of Service Level Objective States", by Goldszmidt et al., which is assigned to the same assignee of the present application and is hereby incorporated by reference in its entirety.

For example, an attribute vector is generated for a state indicative of a violation of a SLO. An SLO can be any objective for computer resource performance. It will be apparent to one of ordinary skill in the art that the attribute vector may be generated for any state and not necessarily a state representing a violation of an SLO.

The signature creation engine 106 determines models representative of system states in accordance with SLO definitions. SLO models are determined for each possible state of the computer resource. An SLO model may be a classifier representing a probability distribution. Compliance with an SLO is determined by comparing metrics collected by the performance monitor 104 to the SLO models. Some of those SLO models may represent a state indicative of a violation of the SLO. If the collected metrics closely fit a model indicative of a violation, then a performance problem is determined.

The signature creation engine 106 generates a model including a representation for each possible state of the computer resource for each SLO. The signature creation engine 106 also identifies key metrics within each model that are alone or in combination indicative of the SLO state the model represents. Key metrics are metrics within a model that are most indicative of the SLO state of the model. In one example, the key metrics are identified by computing a relevance score for each metric in a model and then ordering the metrics according to relevance in decreasing order. In one embodiment, the relevance score is a probability that a group of metrics are indicative the SLO state for the model. In some instances, the relevance score of a single metric or a group of metrics is also a probability that the metric or group of metrics indicate a root cause of a negative SLO state. The metrics having a high probability, such as a probability greater than a threshold, may be selected as the key metrics. Both the key metrics and the models may be determined using a probability distribution. In one embodiment, known classifier algorithms, such as Bayesian classifiers, may be used for generating the models.

The attribute vector may include the key metrics, which, for example, is a subset of all the metrics measured by the performance monitor 104, for a model that closely fits measured metrics. The key metrics may include raw values or Boolean values. The Boolean values, for example, may represent whether a particular metric is in violation of a threshold.

Table 1 shows an example of an attribute vector.

TABLE 1

| Metric Name | Raw Value | Boolean Value | Attribute Vector |
|---|---|---|---|
| transaction count | 638.00 | 1 | 638.00 |
| gbl app cpu util | 17.54 | 0 | 0 |
| gbl app alive proc | 381.00 | 1 | 381.00 |
| gbl app active proc | 291.00 | 1 | 291.00 |
| gbl app run queue | 0.13 | 0 | 0 |
| gbl app net in packet rate | 586.00 | 0 | 0 |
| gbl app net out packet rate | 447.60 | 1 | 447.60 |
| gbl mem util | 51.69 | 0 | 0 |
| gbl mem user util | 23.48 | 1 | 23.48 |
| dbl cpu util | 26.08 | 1 | 26.08 |

Table 1 lists, for example, metrics collected by the performance monitor 104. The raw value column lists the raw values for each metric. The Boolean value column indicates whether a metric is a key metric. For example "1" indicates a key metric. In one example, the attribute vector column lists the raw values that may be included in the attribute vector, such as raw values for each key metric. In another example, the attribute vector includes Boolean values for key metrics that contribute to a violation of the SLO. In yet another embodiment of a signature, a vector may include a Boolean value for any metric that violates a threshold, such as when a metric exceeds a threshold and that is undesirable or when a metric falls below a threshold and that is undesirable.

Once the signature is created by the signature creation engine 106, an annotation may be provided by a user through the interface 108. In another example, an automated system may be used to generate the annotation. The interface 108 may be a data entry system allowing a user, such as an administrator or other user, to annotate the signature.

If the signature represents a state of a computer resource indicative of a problem, such as a performance problem, fault or failure, the annotation may include a description of the problem and/or a diagnosis of the problem. Additionally, the user may annotate the signature with a solution to the problem. Annotations may be determined for a computer resource even when the computer resource does not have a problem and may be used for capacity planning and describing normalcy states of the computer resource, such as when the computer resource is operating within predetermined parameters. One or more of the predetermined parameters, for example, are determined from service level objectives (SLOs) or service level agreements (SLAs). For example, the annotation may describe a state where the computer resource is load-balanced. Generally, an annotation may be provided for any signature, regardless of whether the state is indicative of a computer resource operating in a positive or negative manner. This information is input to the database interface 110 and then stored in the database 112.

The database interface 110 is operable to store and retrieve information in the database and search the database. FIG. 1 illustrates inputting a query 120 into the database 112 via the database interface 110 and receiving search results 122 for the query 120. The search results 122 may include signatures from the database 112 that match or closely match the search 120 and the corresponding annotations. For example, an administrator is having problems with a computer resource. The administrator determines a signature representing the state of the computer resource indicative of the problem and generates the query 120 including the signature. The search results 122 may include signatures closely matching the signature in the query 120 and corresponding annotations. These annotations may indicate solutions or diagnosis of the problem. In another example, the administrator is deigning a system and searches for signatures representing positive performance, such as a load-balanced state. The query 120 is not required to include a signature and, for example, may include a test search for annotations meeting the query. When a signature is used in the query 120, the signature is of the same type of signatures stored in the database so the signatures can be compared to identify close matches. Examples of types of signatures may include raw value vectors or attribute vectors described below.

As described above, the database interface 110 is operable to retrieve signatures and corresponding annotations. For example, the query 120 includes a signature, referred to as a search signature. The database interface 110 is operable to identify at least one signature closely matching the search signature. A closely matching signature may include an exact match or a signature determined to be similar to the search signature. Known algorithms may be used to identify signatures similar to the search signature. For example, a Hamming distance may be used to identify and specify the degree of similarity. For example, signatures within 2 Hamming distances from the search signature may be retrieved along with corresponding annotations.

In one embodiment, the database interface 110 is operable to provide precision and recall for searching the database 110. For example, user feedback is used to tag retrieved signatures in the search results 122 that are considered relevant. This process may be repeated for several searches and the results may be prioritized or a subset of the results may be selected based on metrics that are used to identify the most relevant search results and the user feedback.

The number of signatures gathered and stored in the database 112 may be rather large. In addition, a rather large number of signatures may represent the same problem. As such, the signatures and corresponding annotations may be organized to optimize searches.

Figure 2:
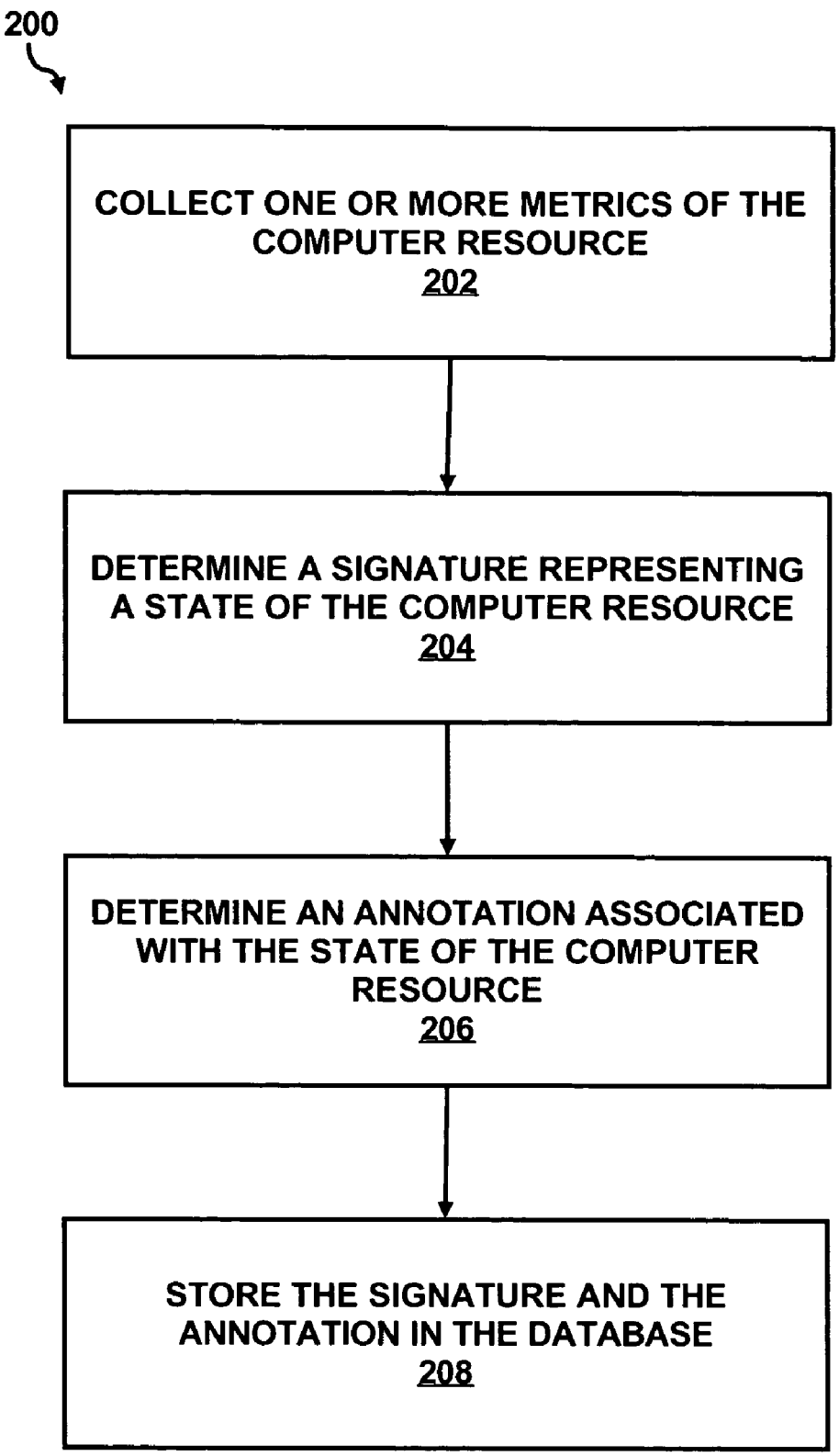
FIG. 2 shows a flow diagram of a method for creating a signature database in accordance with an embodiment of the invention.
Figure 3:
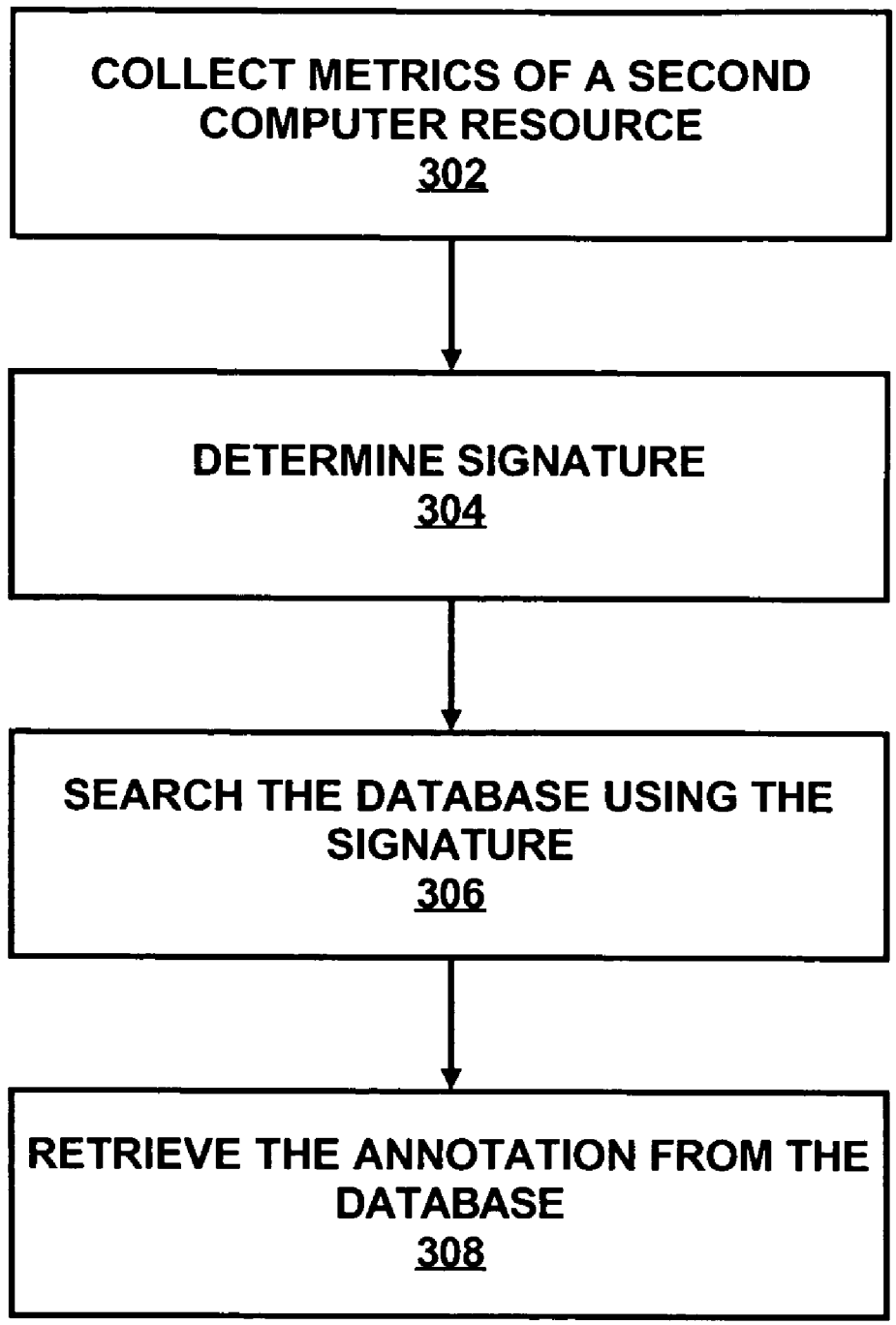
FIG. 3 shows a flow diagram of a method for creating a signature database with another embodiment of the invention.

FIGS. 2–3 show flow diagrams of methods 200 and 300 for creating a signature database. The following description of the methods 200 and 300 are made with reference to the system 100 illustrated in FIG. 1, and thus makes reference to the elements cited therein. The methods 200 and 300 are described with respect to the system 100 by way of example and not limitation.

In the method 200, at step 202 one or more metrics for a computer resource are collected. For example, the signature creation engine 106 receives metrics measured for the computer resource 102 by the performance monitor 104. The metrics, for example, are measured values or values calculated from measured values, such as a mean of values for metric measured during a time interval using the performance monitor 104. At step 204, the signature creation engine 106 determines a signature representing a state of the computer resource 102 from the metrics. Examples of signatures may include a raw value vector or an attribute vector. At step 206, a user or an automated system determines an annotation associated with the at least one state of the computer resource. This annotation is received by the database interface 110. For example, the user inputs the annotation through the interface 108. The database interface 110 stores the signature and the annotation in the database 112 at step 208.

In the method 300, at step 302 one or more metrics for a second computer resource, such as the computer resource 102, are collected. This may include receiving metrics, measuring the metrics, and/or using measured values to calculate other values, such as a mean, as metrics. At step 304, the signature creation engine 106 determines a signature from the one or more metrics. The signature is a search signature used to search to database 112. Steps 204, 206, and/or 208 may be performed to determine the search signature. At step 306, the database interface 110 searches the database 112 using the search signature. At step 308, one or more signatures closely matching the search signature are identified from the database and the annotations corresponding to the closely matching signatures are retrieved possibly along with the signatures. These annotations may be used to diagnose and determine solutions for a performance problem for the second computer resource 116. One signature or multiple signatures closely matching the search signature may be identified at step 306.

Some of the steps illustrated in the methods 200 and 300 may be contained as a utility, program, subprogram, in any desired computer accessible medium. In addition, the methods 200 and 300 may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Figure 4:
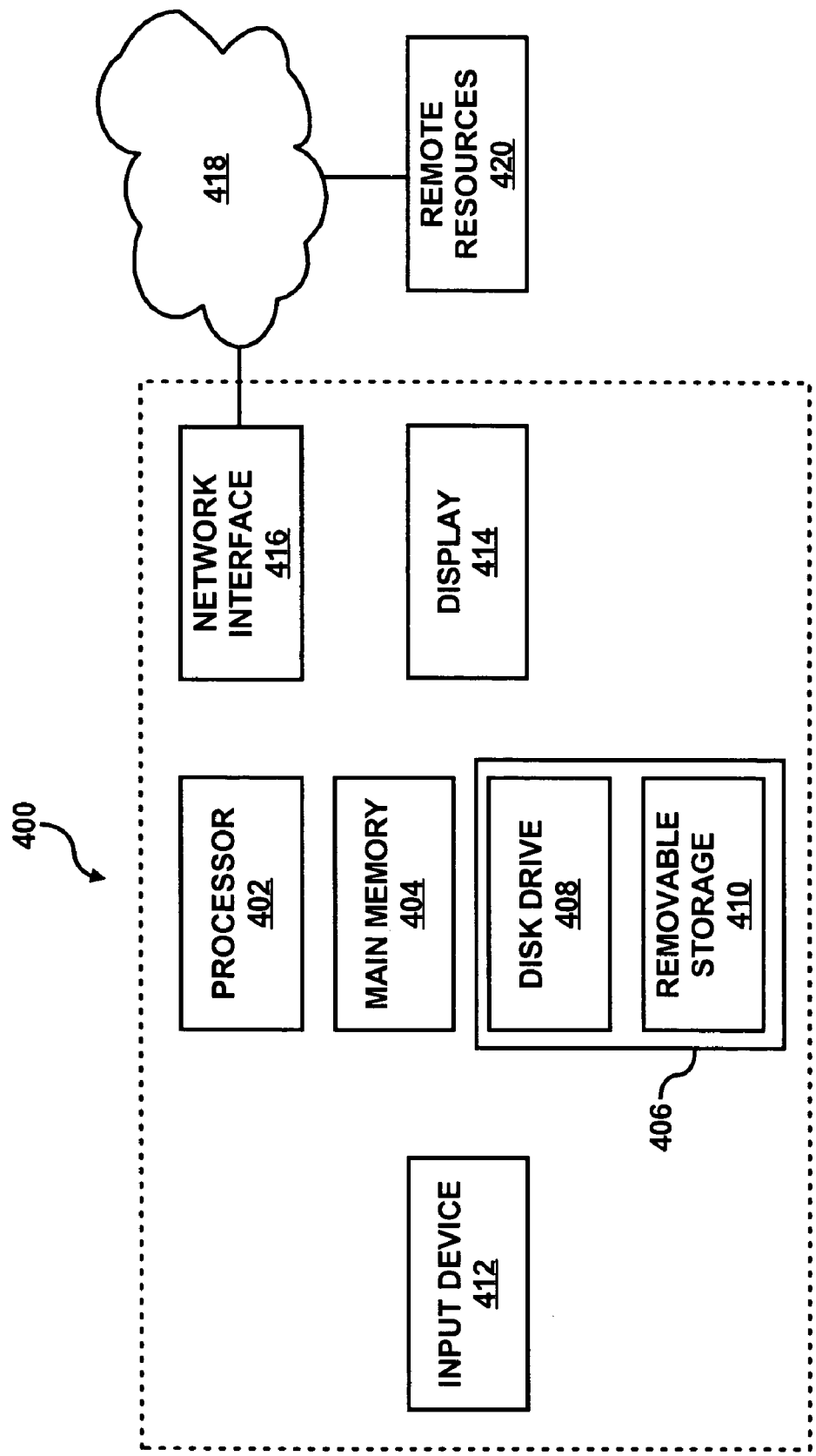
FIG. 4 shows a schematic diagram of a computer system in which embodiments of the invention may be implemented.

FIG. 4 illustrates an exemplary block diagram of a computer system 400 that may implement some of the methods shown in FIGS. 2 and 3. The computer system 400 includes one or more processors, such as processor 402, providing an execution platform for executing software. The processor 402 may also execute an operating system (not shown) for executing the software in addition to performing operating system tasks.

The computer system 400 also includes a main memory 404, such as a Random Access Memory (RAM), providing storage for executing software during runtime and mass storage 406. The mass storage 406 may include a hard disk drive 408 and/or a removable storage drive 410, representing a floppy diskette drive, a magnetic tape drive, a compact disk drive, or a nonvolatile memory where a copy of software or data may be stored. Applications and resources may be stored in the mass memory 406 and transferred to the main memory 404 during run time. The mass memory 406 may also include ROM (read only memory), EPROM (erasable, programmable ROM), EEPROM (electrically erasable, programmable ROM).

A user interfaces with the computer system 400 with one or more input devices 412, such as a keyboard, a mouse, a stylus, or any other input device and views results through a display 414. A network interface 416 is provided for communicating through a network 418 with remote resources 420. The remote resources 420 may include servers, remote storage devices, data warehouses, or any other remote device capable of interacting with the computer system 400.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A method comprising:
   collecting one or more metrics of a computer resource;
   determining a signature representing a state of the computer resource from the one or more metrics, wherein determining the signature further comprises,
   determining raw values for each of the one or more metrics; and
   generating a vector from at least some of the raw values for each of the one or more metrics, and wherein generating the vector further comprises generating models for possible system states of the computer resource, determining a model that closely matches a state of the computer resource, determining key metrics for the model, and determining a vector of values from the key metrics;
   receiving an annotation that describes the state of the computer resource;
   associating the signature with the annotation; and
   storing the signature and the associated annotation such that the stored signature and associated annotation are searchable.

2. The method of claim 1, wherein storing the signature and the annotation further comprises:
   storing the signature and the annotation with a plurality of previously stored signatures and corresponding annotations such that the stored signatures and annotations are searchable.

3. The method of claim 2, wherein storing the signature and the annotation further comprises:
   storing the signature and the annotation in a database including the previously stored signatures and corresponding annotations.

4. The method of claim 1, wherein generating the vector further comprises:
   generating the vector from the raw values for each of the one or more metrics.

5. The method of claim 1, wherein the vector comprises Boolean values for metrics indicative of the state of the computer resource.

6. The method of claim 1,
   wherein the key metrics include at least some of the collected one or more metrics that are representative of the state.

7. The method of claim 1, wherein receiving an annotation that describes the state of the computer resource further comprises:
   receiving an annotation including at least one of a diagnosis and solution of the computer resource when the state is associated with a problem of the computer resource.

8. The method of claim 1, wherein receiving an annotation that describes the state of the computer resource further comprises:
   receiving an annotation including a description of the state when the state is associated with a the computer resource operating within predetermined parameters.

9. The method of claim 3, further comprising:
   measuring one or more metrics of a second computer resource;
   determining a search signature from the one or more metrics representing at least one state of the second computer resource;
   searching the database using the search signature; and
   retrieving at least one annotation from the database associated with at least one signature identified from searching the database using the search signature.

10. The method of claim 9, further comprising:
    using user feedback to identify search results that are most relevant.

11. The method of claim 1, further comprising:
    wherein collecting one or more metrics of a computer resource further comprises collecting one or more metrics of a computer resource over a plurality of time intervals;
    wherein determining a signature from the one or more metrics further comprises determining a signature for each time interval wherein each signature represents a state of the computer resource at a respective time interval; and
    wherein receiving an annotation further comprises receiving an annotation for at least some of the signatures.

12. A method of searching a database, whereby the database stores a plurality of signatures representing states of at least one computer resource and corresponding annotations, the method comprising:
    receiving a first signature, wherein the first signature comprises a vector of values determined from at least one key metric representative of a state of the computer resource, and wherein the vector of values is determined from a model of a plurality of possible system state models that matches the state of the computer resource;

searching the database for at least one signature closely matching the first signature;

retrieving at least one of a signature and annotation for each of the closely matching signatures from the database; and outputting the retrieved at least one of a signature and annotation.

13. The method of claim 12 wherein the first signature represents a state of a first computer resource.

14. The method of claim 12 wherein the first signature is determined from metrics collected for the first computer resource and the metrics are associated with the performance of the first computer resource.

15. The method of claim 14 wherein the state is associated with at least one of a performance problem, fault, and failure of the first computer system and the annotation includes at least one of a diagnosis and solution.

16. The method of claim 12, wherein the signature is representative of a computer resource operating within predetermined parameters.

17. A computer system comprising:

a signature creation engine operable to determine a signature representing a state of the computer system from a set of metrics for the computer system, wherein the signature creation engine is configured to determine raw values for each of the metrics, to generate a vector from at least some of the raw values for each of the metrics, to generate models for possible system states of the computer system, to determine a model that closely matches a state of the computer resource, to determine key metrics for the model, and to determine a vector of values from the key metrics to thereby determine the signature;

an interface operable to allow a user to annotate the signature with information relating to the state of the computer system; and a database operable to store the signature along with the information relating to the state of the computer system.

18. The computer system of claim 17, wherein the database is searchable to identify at least one signature closely matching a signature used to search the database and is operable to retrieve each closely matching signature and corresponding information annotated for each closely matching signature.

19. The computer system of claim 17, further comprising a performance monitor collecting the set of metrics.

20. An apparatus comprising:

means for determining a signature representing the state of a computer resource from a set of metrics for the computer resource, wherein the means for determining is configured to determine raw values for each of the metrics, to generate a vector from at least some of the raw values for each of the metrics, to generate models for possible system states of the computer system, to determine a model that closely matches a state of the computer resource, to determine key metrics for the model, and to determine a vector of values from the key metrics to thereby determine the signature; and means for storing the signature and an annotation including information associated with the state of the computer system.

21. The apparatus of claim 20, further comprising:

means for searching the means for storing for at least one signature closely matching a first signature; and means for retrieving at least one of each closely matching signature and corresponding annotation from the means for storing.

22. The apparatus of claim 20, further comprising:

means for collecting the set of metrics, wherein the set of metrics are a measure of the performance of the computer resource.

23. A computer program stored on a computer readable medium and comprising code that when executed causes a computer to perform the following:

determining a signature representing a state of a computer resource from one or more metrics for the computer resource, wherein determining the signature further comprises, determining raw values for each of the one or more metrics;

generating a vector from at least some of the raw values for each of the one or more metrics, and wherein generating the vector further comprises generating models for possible system states of the computer resource, determining a model that closely matches a state of the computer resource, determining key metrics for the model, and determining a vector of values from the key metrics;

receiving an annotation that describes the state of the computer resource;

associating the signature with the annotation; and storing the computer resource, the signature, and the annotation in a searchable database.

24. The computer program of claim 23, further performing:

searching the database for at least one signature closely matching a first signature; and retrieving at least one closely matching signature and corresponding annotation from the database.

* * * * *

UNITED STATES PATENT AND TRADEMARK OFFICE
CERTIFICATE OF CORRECTION

PATENT NO. : 7,184,935 B1  
APPLICATION NO. : 11/149566  
DATED : February 27, 2007  
INVENTOR(S) : Ira Cohen et al.

Page 1 of 1

It is certified that error appears in the above-identified patent and that said Letters Patent is hereby corrected as shown below:

In column 5, line 30, delete "test" and insert -- text --, therefor.

In column 6, line 29, after "search" delete "to" and insert -- the --, therefor.

In column 8, line 33, in Claim 8, after "with" delete "a".

Signed and Sealed this

Twenty-fifth Day of August, 2009

David J. Kappos
*Director of the United States Patent and Trademark Office*